March 17, 1959 R. C. LORING 2,877,554
SEISMIC SIGNAL INTERPRETATION APPARATUS
Filed Oct. 18, 1957 2 Sheets-Sheet 1

INVENTOR.
R.C. LORING
BY Hudson & Young
ATTORNEYS

March 17, 1959 R. C. LORING 2,877,554
SEISMIC SIGNAL INTERPRETATION APPARATUS
Filed Oct. 18, 1957 2 Sheets-Sheet 2

INVENTOR.
R.C. LORING
BY Hudson & Young
ATTORNEYS

United States Patent Office 2,877,554
Patented Mar. 17, 1959

2,877,554

SEISMIC SIGNAL INTERPRETATION APPARATUS

Ralph C. Loring, Bartlesville, Okla., assignor to Phillips Petroleum Company, a corporation of Delaware Application October 18, 1957, Serial No. 691,012

10 Claims. (Cl. 33—27)

This invention relates to the interpretation of seismic records.

Seismic exploration refers to a method of obtaining information regarding subterranean earth formations by transmitting vibrations from a first point at or near the surface of the earth downwardly into the formations and measuring the reflected vibrations at one or more second points spaced from the first point. It is common practice to detonate an explosive charge to produce the vibrations. A plurality of vibration responsive geophones are disposed in a predetermined geometric array in spaced relationship from the shot hole. The vibrations incident upon the geophones are converted into corresponding electrical signals which are amplified and recorded. By measuring the travel times of selected vibrations, valuable information can often be obtained regarding the depth and slope of subterranean reflected formations. However, in many areas there exists above the reflecting beds to be located an interface between formations which transmit vibrations at substantially different velocities. This interface causes a refraction of the vibrational waves so that serious errors are introduced in conventional interpretation methods. For example, these errors can even result in a syncline being indicated as an anticline.

In accordance with the present invention there is provided apparatus for use in interpreting seismic signals in areas wherein reflecting beds are located beneath an interface between formations which transmit vibrations at different velocities. This apparatus permits wave forms to be plotted which are representative of the vibrations reflected at the interface. The positions of the wave forms are representative of the subterranean reflecting beds. By the use of this apparatus, it is possible to draw maps which accurately position the reflecting beds to be located. The computing apparatus of this invention comprises a series of sliding bars which are geared to one another in a manner representative of the different velocities at which the waves travel in the formations above the reflecting beds.

Accordingly, it is an object of this invention to provide apparatus for use in the interpretation of seismic signals to measure the depth and dip of reflecting beds.

Another object is to provide novel computing apparatus to facilitate the preparation of drawings representative of subterranean earth formations.

Other objects, advantages and features of the invention should become apparent from the following detailed description which is taken in conjunction with the accompanying drawing in which.

Figure 1:
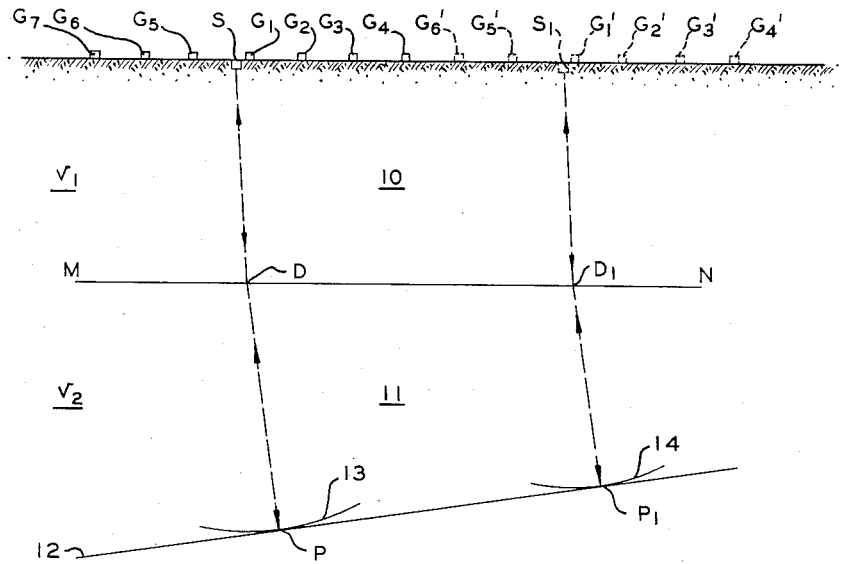
Figure 1 is a schematic representation of a seismic explosion system in a region wherein the computer of this invention is useful.

Referring now to the drawing in detail, and to Figure 1 in particular, there is shown a seismic explosion system in an area characterized by an upper formation 10 which transmits vibrations at a velocity $v_1$. The formation 11 beneath formation 10 transmits vibrations at a greater velocity $v_2$. Line MN represents the plane of the interface between formations 10 and 11. This type of structure is characteristic of many areas of the United States and Canada. Formation 10, for example, can represent layers of shale and sandstone which transmit vibrations at velocities of from about 6,000 to 12,000 feet per second. Formation 11 can comprise limestone or other dense materials which transmit vibrations at velocities of from about 15,000 to 25,000 feet per second. The interface between the two formations can occur at or near the surface of the earth down to depths as great as about 13,000 feet. The weathered layer which often occurs adjacent the surface of the earth has been omitted from Figure 1 for simplicity. In the practice of this invention it is necessary to know the values of $v_1$ and $v_2$, at least to a fairly close approximation. These velocities can be determined by detonating a series of explosive charges in a well which extends downwardly through the interface. The times for vibrations to travel from these explosive charges to the the surface are measured in order to compute the velocities at which the vibrations travel. If such a well is not available, the velocities can be approximated by seismic shooting procedures known to those skilled in the art.

In normal seismic exploration procedures, it is common practice to detonate an explosive charge at a shot point S located near the surface of the earth. A plurality of geophones $G_1$, $G_2$, . . . $G_7$ are positioned in spaced relationship from shot hole S in the manner illustrated. These geophones detect vibrations which are reflected upwardly from subterranean earth formations. In accordance with the present invention, geophone $G_1$ is positioned adjacent to shot point S to detect vibrations which are reflected back to this shot point. A second charge is subsequently detonated at a second shot point $S_1$. The reflected vibrations are detected by a plurality of geophones $G_1'$, $G_2'$, . . . $G_6'$ and another geophone which is located at the region originally occupied by geophone $G_4$. There normally is some overlapping between geophones which detect vibrations from adjacent shot holes in order to detect discontinuations of the reflected beds between the adjacent shot holes. The above-described procedure then is repeated at other shot points.

In the system illustrated in Figure 1 it is assumed that vibrations are reflected by an interface 12 beneath formation 11. A portion of the energy from shot point S travels downwardly to point D and is refracted so as to follow a second path downwardly to point P. This wave is reflected back from point P and is received at geophone $G_1$. A portion of the energy from shot point $S_1$ follows a similar path between points $D_1$ and $P_1$. The apparatus of this invention permits curves 13 and 14 to be drawn which represent the wave fronts of these portions of the energy. Line 12 is then drawn in a direction which is tangential to curves 13 and 14 to represent the reflecting bed.

The computing apparatus of this invention is illustrated in Figures 2, 3, 4 and 5. The computer comprises a T-shaped bar 15 having legs 16 and 17 at right angles. Slots 16a and 17a are formed in respective legs 16 and 17. A second bar 18 is formed by two legs 19 and 20 which slidably engage one another so that the length of bar 18 is variable. Leg 19 is provided with a series of holes 21 near the first end thereof. A screw 22 extends through one of these holes into a plate 23 which is disposed in slot 16a of leg 16. Bar 18 is thus pivotally attached to bar 15 and is free to slide in slot 16a. Leg 20 is provided with a rack 25 which meshes with a gear 26. Gear 26 is attached to a shaft 27 which encloses a pin 28 that extends upwardly from a plate 29 that is disposed in slot 17a so as to be free to slide therein.

Shaft 27 carries a second gear 30 which meshes with a rack 31 that is carried by a third bar 32. The two racks are held in engagement with gears 26 and 30 by means of a cap 33 which is threaded to the top of pin 28. The second end of bar 32 is provided with a series of holes 34. A cap 35 extends through one of these holes to engage a plate 36 which is positioned within slot 16a. This assembly permits bar 32 to pivot about a fixed adjustable point on leg 16 of bar 15. A bar 37 having a series of holes 38 therein is attached to bar 32 by a bolt 39 and to bar 18 by a bolt 40. Bar 37 is adjusted initially so as to be substantially parallel to leg 16.

A plate 40 is attached to the end of leg 20 of bar 18 by means of an adjusting spring 42 which is secured thereto by screws, not shown. This permits plate 40 to be moved along leg 20. Plate 40 carries a marking pencil or pen 43 which has a knob 41 secured thereto.

Racks 25 and 31 are provided with the same number of teeth per unit length. Gears 26 and 30 are selected so that the ratio of the number of teeth per gear is the same as the ratio of velocity $v_2$ to velocity $v_1$. This results in bars 18 and 32 moving at different speeds with respect to pin 28 when the computer is operated. In normal operation, plate 36 is fixed relative to leg 16 of bar 15. Plates 23 and 29 are free to slide in respective slots 16a and 17a.

As previously mentioned, it is important to know velocities $v_1$ and $v_2$. It is also important to know the depth and dip of interface MN. This normally can be determined from an examination of the signals received at the several geophones. The interface acts as a reflecting bed so that a portion of the downwardly traveling energy is reflected back to the geophones. A comparison of the times of arrivals of these reflections from the several records readily permits the depth and dip of the interface to be computed. Geophone $G_1$ provides an indication of the travel time T for vibrations to travel downwardly to poin P and back to the geophone. If $d_1$ represents the distance SD and $d_2$ repersents the distance DP, the travel time T for the reflected vibration can be represented as follows:

$$T=2\frac{d_1}{v_1}+2\frac{d_2}{v_1} \quad (1)$$

It should be obvious that all of the quantities in this equation are assumed to be known except $d_2$. In the operation of the computer, bar 15 is placed on a paper in a direction representative of interface MN. Plate 36 is attached to slots 16a at a point which is spaced from leg 17 at a distance representative of $d_1$. Plate 36 represents shot point S and is designated by point S' in Figure 5. Leg 20 of bar 18 is extended from pivot point D', see Figure 5, a distance representative of $d_2$ which is computed from the above equation. The apparatus is also adjusted so that the ratio of the distances BD' to CD' is the same as the ratio of velocities $v_2$ to $v_1$. Pivot point D' is then moved along leg 17 so that point P' draws a curve 13 such as shown in Figure 1.

Figure 5:
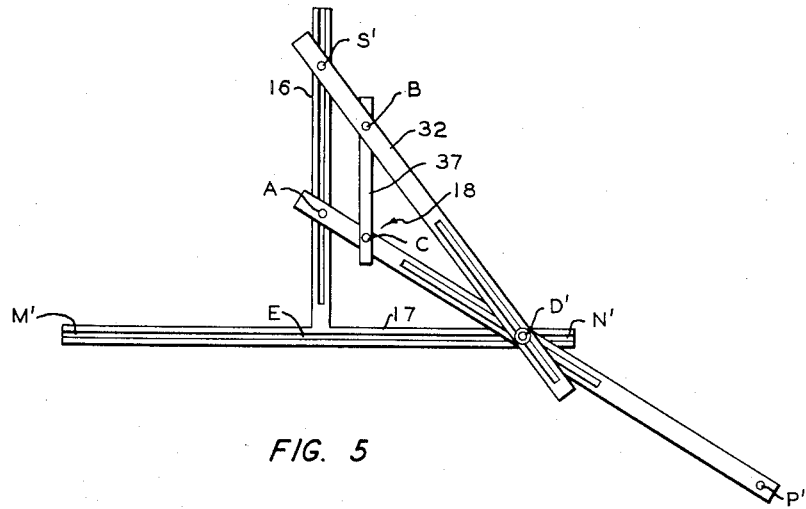
Figure 5 is a schematic view of the computer of Figure 2.
Figure 3:
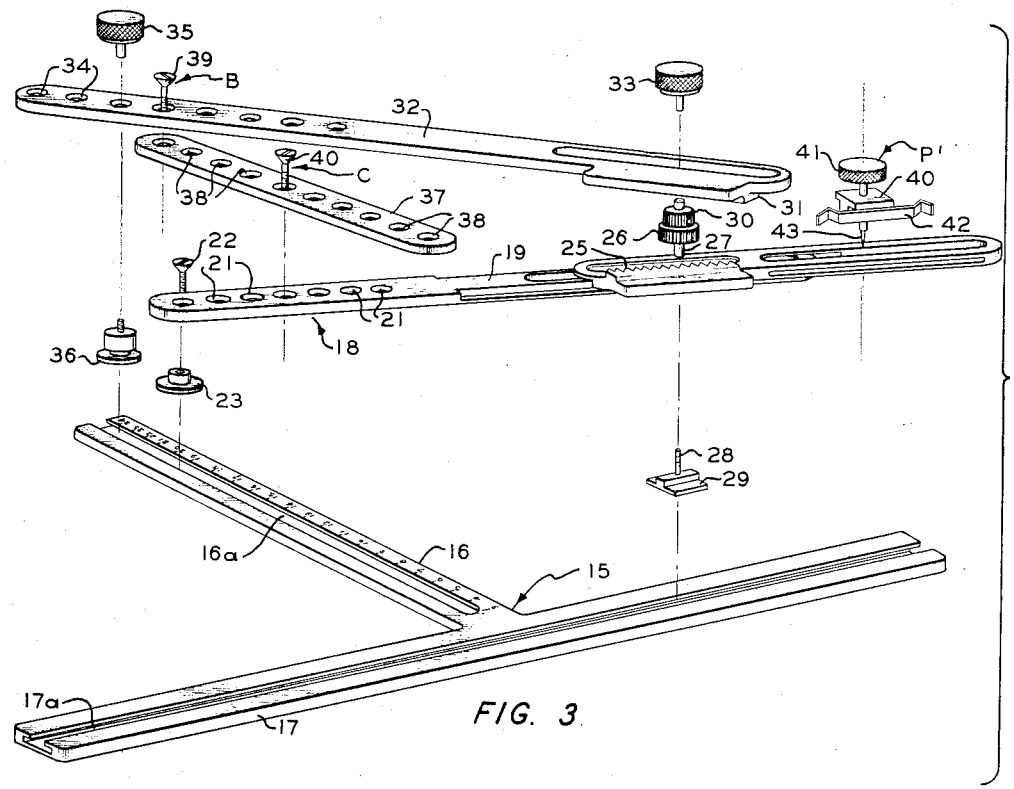
Figure 3 is a view showing construction details of the computer of Figure 2.
Figure 2:
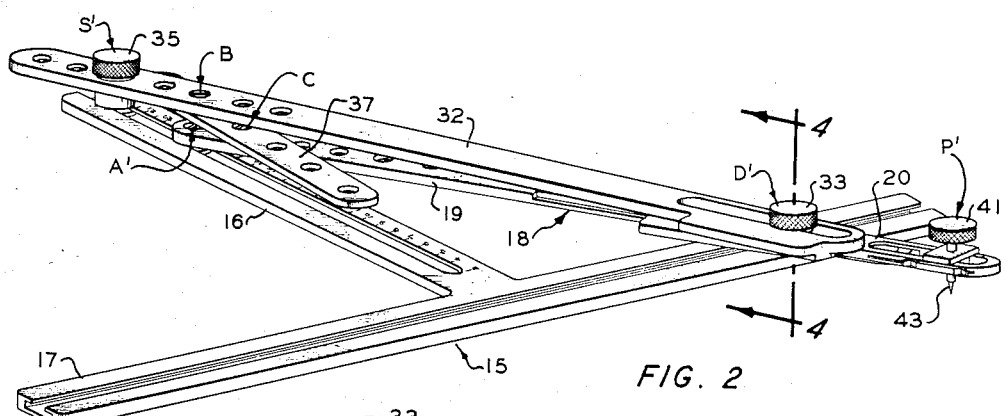
Figure 2 is a perspective view of the computer of this invention.
Figure 4:
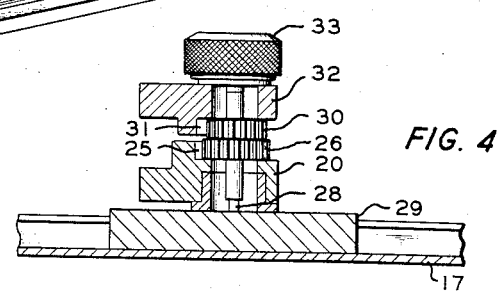
Figure 4 is a view taken along line 4—4 in Figure 2.

The travel time T remains the same in constructing curve 13 as point D' is moved on leg 17. With reference to Figure 5, Equation 1 can be expressed:

$$T=2\frac{S'D'}{v_1}+2\frac{D'P'}{v_2} \quad (2)$$

If point D' is moved to a new position,
$S'D'=(S'D')_0+\Delta S'D'$ and $D'P'=(D'P')_0+\Delta D'P'$, where $(S'D')_0$ and $(D'P')_0$ are the distances at the initial positions and $\Delta S'D'$ and $\Delta D'P'$ are the changes in distances. Equation 2 can be modified:

$$T=2\frac{(S'D')_0+\Delta S'D'}{v_1}+2\frac{(D'P')_0+\Delta D'P'}{v_2} \quad (3)$$

Also, since T does not change:

$$T=2\frac{(S'D')_0}{v_1}+2\frac{(D'P')_0}{v_2} \quad (4)$$

Equations 3 and 4 can be combined and expressed as follows:

$$D'P'=\frac{v_2}{v_1}\Delta S'D' \quad (5)$$

This relationship is maintained by gears 26 and 30.

After curve 13 is drawn, the computer is then moved across the paper a horizontal distance representative of the distance between the shot points S and $S_1$ and the procedure is repeated with the information obtained from geophone $G_1'$. This results in the construction of curve 14. Line 12 is then drawn tangential to curves 13 and 14 to provide an indication of the depth and dip of the reflecting bed. The procedure is repeated for additional shot holes. If additional subterranean beds are present, the curve construction procedure of this invention can be extended by use of Huygens' principle. It should thus be evident that the computer of this invention permits graphs to be drawn which accurately represent subterranean seismic signal reflecting beds.

While this invention has been described in conjunction with a present preferred embodiment, it obviously is not limited thereto.

What is claimed is:

1. Apparatus for interpreting seismic signals comprising a first bar, a second bar extending perpendicular from said first bar, a third bar pivotally attached to said second bar at a first point thereon, a fourth bar pivotally attached to said second bar at a second point thereon which is free to move along said second bar and which is located between said first point and said first bar, a fifth bar pivotally attached to said third bar at a third point and pivotally attached to said fourth bar at a fourth point, and means pivotally attaching said third and fourth bars to said first bar at a fifth point which is free to move along said first bar so that said third and fourth bars can move relative to said fifth point at respective velocities $v_1$ and $v_2$ when said fifth point is moved along said first bar, the distances from said fifth point to said third point and from said fifth point to said fourth point being in the ratio $v_2$ to $v_1$.

2. The apparatus of claim 1 further comprising a marking member secured to said fourth bar on the side of said fifth point remote from said fourth point.

3. The apparatus of claim 2 further comprising means to adjust the distance said marking member is positioned from said fifth point.

4. The apparatus of claim 1 further comprising means to adjust said first point relative to said third bar, means to adjust said second point relative to said fourth bar, means to adjust said third point relative to said third and fifth bars, means to adjust said fourth point relative to said fourth point relative to said fourth and fifth bars, and means to adjust said fifth point relative to said third and fourth bars.

5. Apparatus for interpreting seismic signals comprising a first bar, a second bar extending perpendicular from said first bar, a third bar pivotally attached to said second bar at a first point thereon, a fourth bar pivotally attached to said second bar at a second point thereon which is free to move along said second bar and which is located between said first point and said first bar, a fifth bar pivotally attached to said third bar at a third point and pivotally attached to said fourth bar at a fourth point, a first rack secured to said third bar, a second rack secured to said fourth bar, first and second gears mounted on a common shaft so as to rotate together, means attaching said shaft to said first bar at a fifth point which is free to move along said first bar, said first gear engaging said first rack and said second gear engaging said second rack, the teeth of said racks and gears being such that said third and fourth bars can move relative to said fifth point at respective velocities $v_1$ and $v_2$ when said fifth point is moved along said first bar, the distances from said fifth point to said third point and from said fifth point being in the ratio $v_2$ to $v_1$.

6. The apparatus of claim 5 further comprising a marking member secured to said fourth bar on the side of said fifth point remote from said fourth point.

7. The apparatus of claim 5 wherein said second bar extends perpendicular to said first bar from a point intermediate the ends of said first bar so that said fifth point can be located on either side of said second bar.

8. The apparatus of claim 5 wherein said fourth bar is formed of two sections which are slidably secured to one another to form a single bar.

9. Apparatus for interpreting seismic signals comprising a first bar having a longitudinal slot therein, a second bar extending perpendicular from said first bar at a point intermediate the ends of said first bar, said second bar having a longitudinal slot therein, a third bar, a first plate adjustably disposed in the slot of said second bar to pivotally attach said third bar to said second bar, a fourth bar formed of two sections which are slidably secured to one another to form a single bar, a second plate slidably disposed in the slot of said second bar to pivotally attach said fourth bar to said second bar, a third plate slidably disposed in the slot of said first bar, first and second gears carried by said third plate to rotate together, the ratio of the number of teeth on said first and second gears being $v_1$ to $v_2$, $v_2$ being larger, a first rack carried by said third bar to mesh with said first gear, a second rack carried by said fourth bar to mesh with said second gear, said first and second racks having the same number of teeth per unit length, a fifth bar, means pivotally attaching said fifth bar to said third bar at a first point, means pivotally attaching said fifth bar to said fourth bar at a second point, the distances from said third plate to said first and second points being in the ratio $v_2$ to $v_1$, and marking means secured to said fourth bar on the side of said first bar opposite said second point.

10. The apparatus of claim 9 further comprising means to adjust the distance said marking means is positioned from said third plate.

References Cited in the file of this patent

UNITED STATES PATENTS 2,463,788    McGuckin _____ Mar. 8, 1949

OTHER REFERENCES

Vajk: "Devices for the Construction of Refracted Rays," Geophysics magazine, vol. 19, No. 2, April 1954, pages 237–241.